Feb. 25, 1941.  J. C. CARLTON  2,233,340
CLAMPING MECHANISM
Filed April 6, 1939   5 Sheets-Sheet 1

INVENTOR
Jack C. Carlton,
by his Attorney

Feb. 25, 1941.  J. C. CARLTON  2,233,340
CLAMPING MECHANISM
Filed April 6, 1939   5 Sheets-Sheet 2

INVENTOR
Jack C. Carlton,

Feb. 25, 1941.   J. C. CARLTON   2,233,340
CLAMPING MECHANISM
Filed April 6, 1939   5 Sheets-Sheet 3

INVENTOR
Jack C. Carlton,

Feb. 25, 1941.   J. C. CARLTON   2,233,340
CLAMPING MECHANISM
Filed April 6, 1939   5 Sheets-Sheet 4

INVENTOR:
Jack C. Carlton

Feb. 25, 1941.  J. C. CARLTON  2,233,340
CLAMPING MECHANISM
Filed April 6, 1939  5 Sheets-Sheet 5

INVENTOR

Patented Feb. 25, 1941

2,233,340

UNITED STATES PATENT OFFICE 2,233,340

CLAMPING MECHANISM

Jack C. Carlton, Cincinnati, Ohio, assignor to The Carlton Machine Tool Company, Cincinnati, Ohio, a corporation of Ohio Application April 6, 1939, Serial No. 266,277

11 Claims. (Cl. 77—28)

This invention relates to clamping mechanism particularly of the type used for clamping a part of a machine tool, such as a drilling machine, in adjusted positions, and unclamping the same, and is exemplified as employed for clamping a drill arm in elevational positions, being shown as employed in a radial drilling machine.

It is the object of my invention to employ hydraulic clamping means, the flow of the fluid in which is caused by an electric motor and pump controlled from any suitable point, as from the drill slide, for initiating movement in the same in reverse directions, and selector means operated by the clamping mechanism for selecting the direction of rotation in the electric motor for clamping or unclamping action, and causing stoppage of the same with the clamping mechanism in clamped or unclamped relations, and to provide novel controls and mechanisms to relieve the electric motor from heavy duties, in order that an electric motor of relatively small capacity may be employed for effecting heavy clamping duties and releases therefrom.

The invention consists in novel means for accomplishing these objects; further, in providing a hydraulic clamping mechanism, including a hydraulic motor actuated by a hydraulic pump, having driven connection with a reversible electric motor, and control means actuated by a member of the clamping device for controlling the direction of rotation of the rotor of the electric motor; and, further, in providing adjusting means whereby the moments of cessation of reverse rotations of the electric motor are controlled by the clamping device; and, further, in novel means for controlling the sequence of directions of rotation in the electric motor.

The invention consists, further, in providing novel means and relations of mechanism for mounting the improved mechanism on the radial arm of a drilling machine; further, in providing a novel operating unit comprising the motors and the pump and the element actuated thereby for compactness of mechanism and strength of clamping action; further, in providing novel supporting means for the same; and, further, in so mounting the improved mechanism on the drill arm of a radial drilling machine that it is spaced above the base when located thereover substantially as great a distance as the drill slide is when it is located above the base at given elevations of the drill arm, for freedom of swinging movements above the base and work located thereon.

The invention consists, further, in providing a novel operating unit for the clamping means; further, in providing novel means whereby the operating unit may be assembled on a drill arm and for ease of operative connection with the clamping means; and, further, in providing novel adjustable connections between the operating unit and a plurality of clamps for adjusting their relative clamping moments.

The invention consists, further, in providing novel power relieving means for the actuating means of the clamp to reduce the torque in the electric motor prior to the completion of its actuating duty; and, further, in providing relief of starting torque in the electric motor prior to initiation of movement of the clamping element to enable the electric motor to acquire substantially full speed prior to performance of maximum duty thereby. The provision of such means enables the electric motor to be respectively started and stopped while under diminished load for reducing arcing between switch contacts, and enables the electric motor to acquire substantially full speed and power prior to requirement of heavy duty therefrom, and the adjustments in connection therewith insure fully clamped relation and fully unclamped relation at the respectively clamping and unclamping movements of the clamp.

The invention will be further readily understood from the following description and claims, and from the drawings, in which latter:

Figure 1:
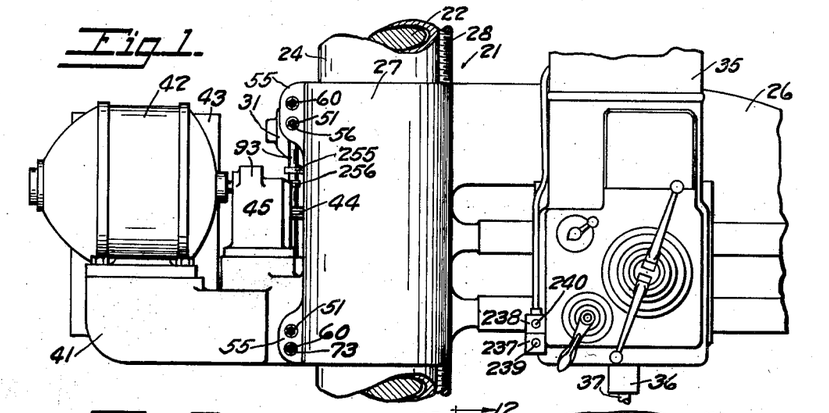
Fig. 1 is a front elevation of a portion of a radial drilling machine embodying the present invention.
Figure 2:
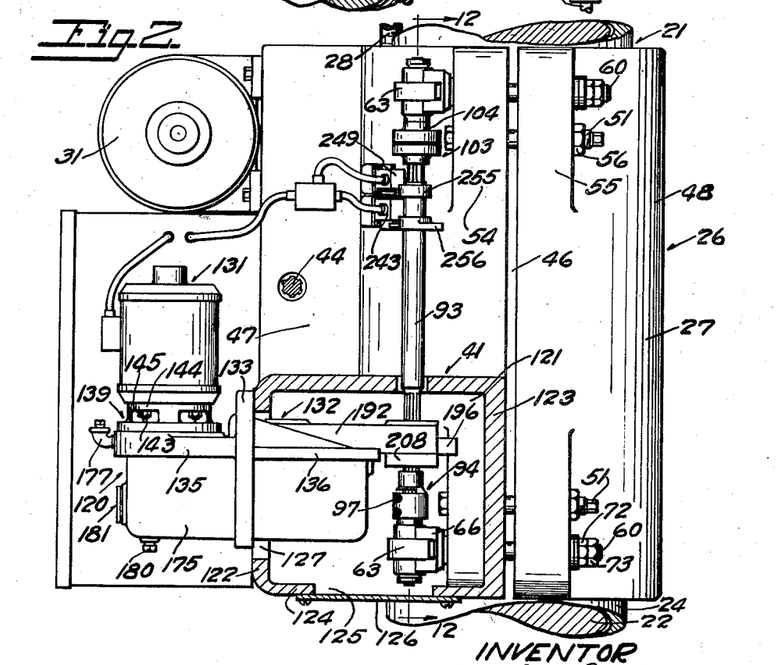
Fig. 2 is an end elevation of the same, partly broken away, and partly in section on the line 2—2 of Fig. 3.
Figure 3:
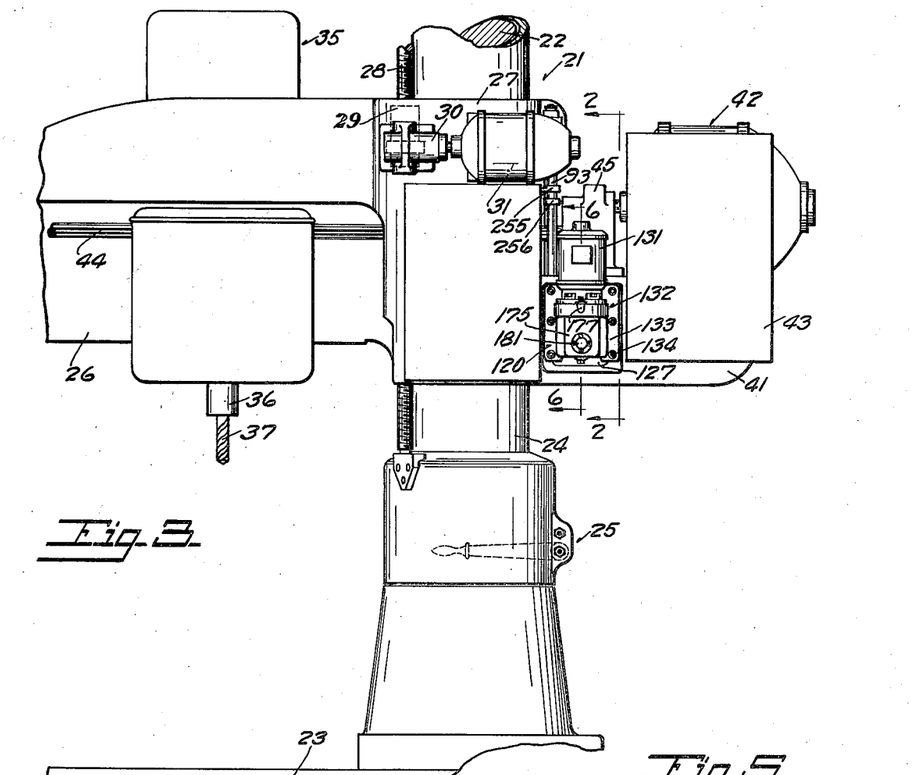
Fig. 3 is a rear elevation of a radial drilling machine embodying the invention, and partly broken away.
Figures 4, 5:
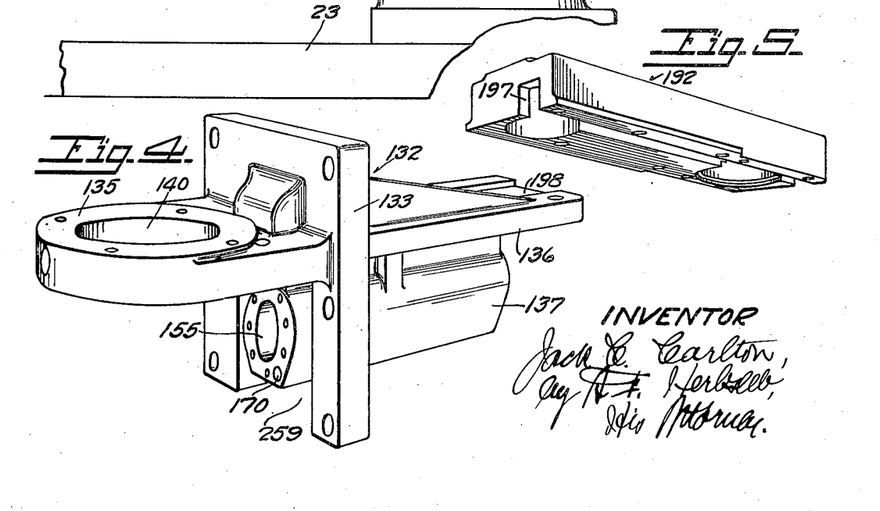
Fig. 4 is a perspective view of the support for the driving unit of the improved device, arranged to be attached to and partially received in the rear extension of the drill arm.
Fig. 5 is a perspective view of a supplemental bracket for the same, arranged for attachment to the support or main bracket shown in Fig. 4.

The radial drilling machine 21 (Figs. 1, 2 and 3) exemplified comprises a usual upright post 22, extending rigidly upwardly from a work supporting base 23, and having a rotatable column 24 rotatable thereabout and arranged to be clamped in adjusted positions thereto by means of a suitable clamp 25. A drill arm 26 has a bearing 27 about the rotatable column, and is adjustable to elevation thereon by means of a usual upright screw 28 and a coacting nut 29, the nut being suitably journaled and held endwise in the drill arm and rotated by suitable gearing, in a gear case 30 on the arm, operated by an electric motor 31 mounted on the arm. A spindle slide 35 is adjustable lengthwise on the arm, and has a drill spindle 36 rotatable and feedable thereon, and arranged to have a usual drill 37 inserted in its lower end.

The drill arm proper extends from one side of the bearing 27, and a shelf 41 extends rigidly at the other side of said bearing. The shelf has thereon a main electric motor 42 and an electric control box 43 therefor for operating the rotating and feeding means for the spindle, and for performing the main power operations of the machine. It has driving connection with the usual cross-shaft 44 extending lengthwise of the drill arm, through the medium of speed reducing gearing in a gear box 45 mounted on the shelf 41 between the main motor and the bearing of the drill arm.

The drill arm is in the present exemplification arranged to be clamped in adjusted elevational positions, (Figs. 1, 6, 13 and 15), this clamping being effected in the present exemplification by providing the bearing 27 as a split bearing, the same being provided with a split 46 extending lengthwise thereof, and by drawing the cheeks 47, 48 of the bearing at the respective sides of the split towards each other to frictionally clamp the bearing about the rotatable column. The shelf 41 extends from one of said cheeks.

A plurality of clamping means is shown for the bearing, located at the respective ends thereof. Each of these is provided with limiting means for limiting separation between the cheeks and with clamping means for drawing the cheeks toward each other. Each of the limiting means is shown as a limiting bolt 51 extending through alined holes 52, 53 in lugs 54, 55 at the respective sides of the split, a nut 56 being threaded over the threaded end of the bolt, the lugs being located between said nut and the head of the bolt.

Each of the clamping means includes a clamping rod 60 passing through alined holes 61, 62 in the lugs. (Figs. 2, 6, 12, 13 and 15.) One end of this rod is provided with a head 63, comprising a ring bearing 64, in which a roller bearing 65 is located. A block 66 has a stem 67 located in a recess 68 in one of the lugs and shouldered against the bottom of the recess. It is formed as a fork and has seats 69, 70 in the respective tines of the fork. The head of the clamping rod is located between the tines and the block has a hole 71 through which the clamping rod extends. The threaded end of the clamping rod has an adjusting nut 72 and a jamb nut 73 threaded thereover, the adjusting nut acting against washers 74, including a split washer 75. The arm clamp is shown in unclamped relation.

Figures 12, 13, 14, 15:
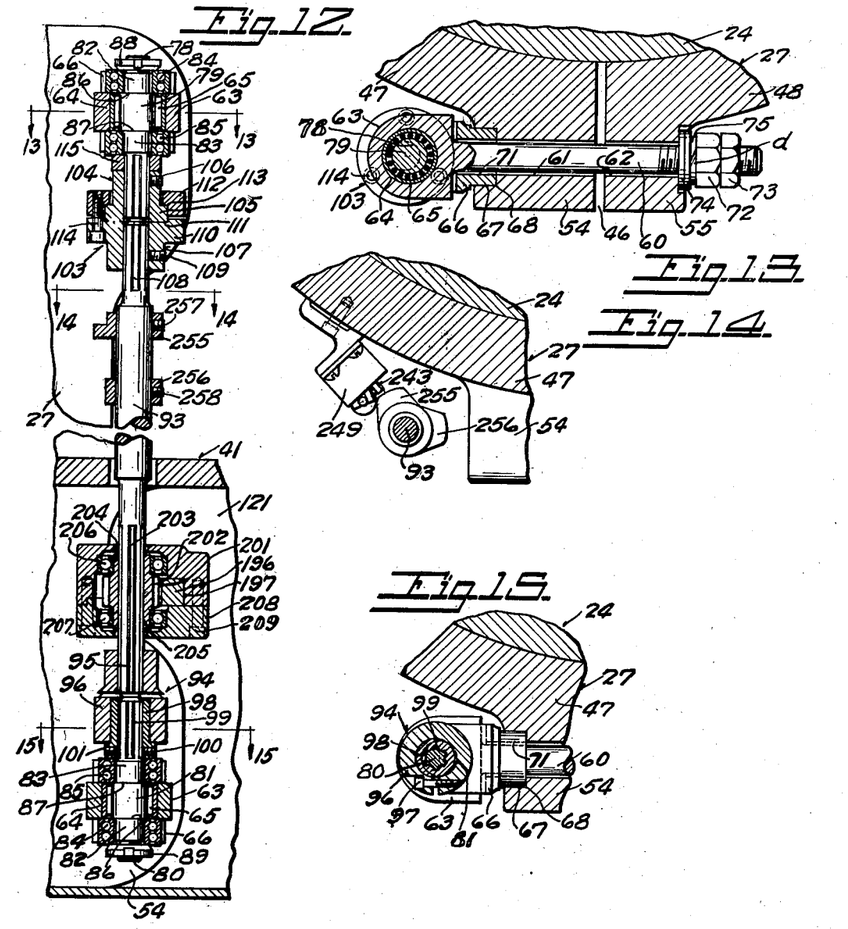
Fig. 12 is a vertical section taken in the plane of the line 12—12 of Fig. 2, and partly broken away.
Figs. 13, 14 and 15 are respectively cross-sectional detail views of the latter, taken respectively in the planes of the lines 13—13, 14—14 and 15—15 of Fig. 12.
Figure 16:
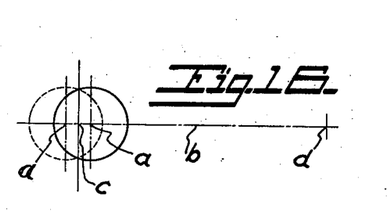
Fig. 16 is a diagrammatic representation of the dead center relations in the clamping mechanism; and, Fig. 17 is a diagrammatic view of the electric connections of the improved device.

In the present exemplification there is an upper set of limiting bolt, clamping rod and lugs at the upper end of the drill arm bearing and a lower set of the same at the lower end of the drill arm bearing, reversely disposed. An upper clamp shaft 78, (Figs. 2, 12 and 13), is provided with an eccentric 79 journaled in the upper roller bearing 65, and a lower clamp shaft 80 (Figs. 2, 6, 12 and 15), is provided with an eccentric 81 journaled in the lower one of the roller bearings 65. These clamp shafts are reversely disposed end to end (Fig. 12). They are respectively provided with journals 82, 83, journaled in pairs of ball bearings 84, 85 at the respective ends of the eccentrics thereon, the ball bearings of the respective pairs being located in the respective seats 69, 70 of the blocks 66. The inner ends of the inner races of the respective pairs of ball bearings are located upon shoulders 86, 87 at the respective ends of the eccentrics. Nuts 88, 89 threaded over the outer ends of the clamp shafts hold the outer ball bearings in place.

A clamp operating shaft 93, operated in manner to be hereinafter described, is operatively connected with the clamp shafts in such a manner as to have angular adjustments therebetween, and is shown as in line therewith and virtually a part thereof, operatively considered. It is rotatable, preferably in opposite directions, for rotating the eccentrics from their unclamping positions (Figs. 6, 13, 15 and 16), in which the high points of the eccentrics extends toward the clamping lugs, to clamping positions, in which the high points of the eccentrics extend away from the clamping lugs, and vice versa.

In the present exemplification, the clamp operating shaft 93 is rotated selectively in reverse directions between fixed limits for clamping and unclamping the bearing 27. In order that equal clamping pressure may be exerted at the respective ends of the bearing, means are provided between the clamp operating shaft and the clamp shafts 78, 80, for adjusting the angular relations between said respective clamp shafts and said clamp operating shaft.

The adjusting means between the lower clamp shaft and the clamp operating shaft (Figs. 6, 12 and 15), comprise an adjustable clamp coupling 94, rotatively fixed to the lower end of the clamp operating shaft by spline connections 95 and provided with a split clamp bearing 96 (Figs. 6, 12 and 15) arranged to be clamped by screws 97, of which there may be a plurality, passing through holes in one of the cheeks of said bearing and threaded into the other cheek thereof, about a bushing 98 having adjustable spline connection 99 about the lower clamp shaft, and fixed rotatively and endwise on said lower clamp shaft by set screws 100 threaded in said bushing. This bushing locates the inner race of the ball bearing next thereto. The lower portion of this bushing is provided with an annular shoulder 101, upon which the coupling 94 bears to limit downward movement of the coupling. Upon loosening of the screws 97 the lower clamp shaft may be adjusted angularly with relation to the clamp operating shaft and to the upper clamp shaft.

Means are provided for adjusting the angular relation between the upper clamp shaft 78 and the clamp operating shaft 93, exemplified (Figs. 12 and 13) as a coupling 103, comprising a coupling member 104 provided with a flange 105 and secured to the splined end of the upper clamp shaft in adjustable angular and endwise relation by set screws 106. A mating coupling member 107 has spline connection 108 with the upper end of the clamp operating shaft and is fixed in rotative and endwise adjustable relation thereon by set screws 109. The coupling member 107 is provided with a flange 110 and has an annular recess 111 about its axis in which the lower end of the coupling member 104 is located for aligning the same. A clamp ring 112 is located about the member 104 and has an annular rabbet 113 therein, in which the flange 105 is located. Screws 114 pass through holes in the flange 110 and are threaded into the ring 112 to firmly clamp the coupling members 104 and 107 together in relatively angularly adjusted positions so as to relate the moment of clamping of the upper clamp with the moment of clamping of the lower clamp. The clamp shaft 78 has a collar 115 thereon between the coupling member 104 and the inner race of the lower one of the upper pair of ball bearings to relatively locate the parts.

When the screws 114 are loosened the members 104, 107 may be rotated relative to each other to angularly adjust the upper clamp shaft and eccentric thereon relatively to the clamp operating shaft and to the lower clamp shaft. The means exemplified enables the respective clamps to be adjusted with relation to each other and with relation to their operating shaft so that the moments of maximum clamping action in both clamps are simultaneous.

Figure 9:
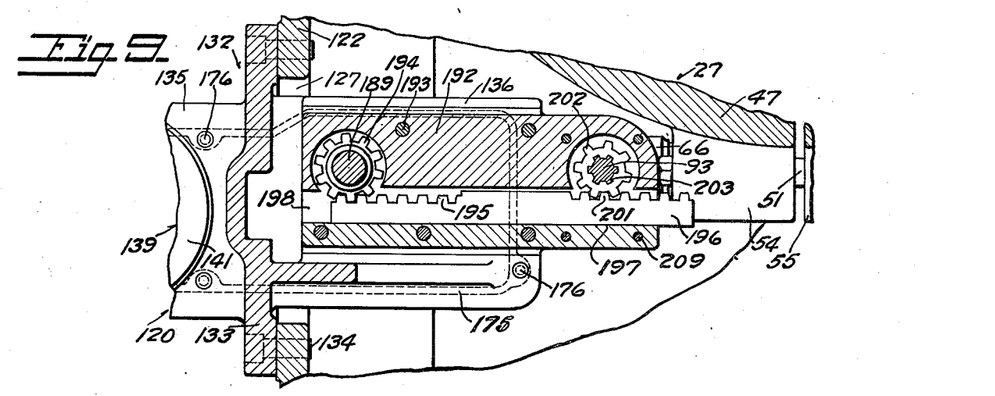
Fig. 9 is a horizontal sectional view, taken in the plane of the line 9—9 of Fig. 6, and partly broken away.
Figure 10:
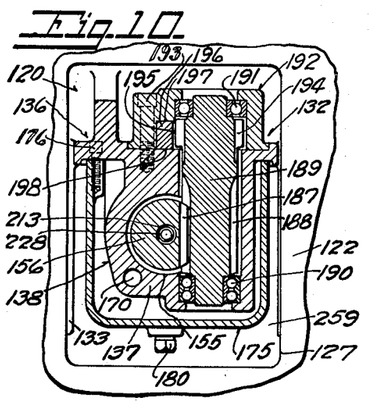
Fig. 10 is a vertical sectional view of a portion of the clamp actuating mechanism, taken in the plane of the line 10—10 of Fig. 6, and partly broken away.
Figure 11:
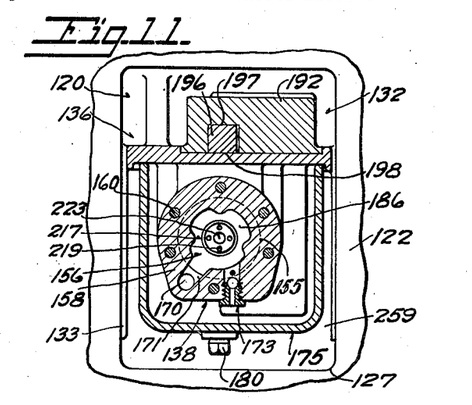
Fig. 11 is a cross-sectional detail view, taken in the plane of the line 11—11 of Fig. 6, and partly broken away.

Operating means are provided for the clamping mechanism. These operating means are preferably constructed as a unit 120 for attachment to the drill arm so as to extend partway into a cavity 121 under the shelf 41 of the arm, (Figs. 2, 6 and 9), the shelf having depending walls 122, 123 between which said cavity is located, these depending walls having lower inturned flanges 124, having a space 125 therebetween closed by a closing plate 126 releasably screwed to said flanges. The rear wall 122 has an opening 127 therein through which a portion of said unit extends.

The operating means comprise hydraulic means for rotating the shafts in reverse directions. These hydraulic means preferably derive their power from a reversible electric motor 131 (Figs. 2, 4, 6 and 9). The operating unit comprises a support 132, which includes a securing flange 133, by means of which the unit is releasably secured to the shelf of the drill arm by bolts 134 at the opening 127. It comprises an outwardly extending bracket 135 and an inwardly extending shelf bracket 136, the latter having a cylinder 137 of a hydraulic motor 138 depending therefrom, this motor being exemplified as a linearly reciprocating motor.

The electric motor 131 is mounted in vertical position on a motor support 139 shown as a cylindrical member which depends through an opening 140 in the bracket 135, and is provided with an annular flange 141 secured to said bracket by means of bolts 142. The electric motor is exemplified as individual to the unit and as secured to said bracket by means of studs 143 threaded into the motor frame and arranged to pass through holes in lugs 144 at the upper end of the motor support, nuts 145 threaded over the studs attaching the motor rigidly to said support.

A hydraulic pump 147, shown as a gear pump, is fastened by bolts 148 to the lower end of the motor support 139. It is arranged to have a slight leakage past the gears, effective at the lower speeds of rotation of the motor to enable the electric motor to quickly acquire full operating speed and power immediately after energizing the same. The shaft 149 of the rotor of the pump is journaled in ball bearings 150 in an extension 151 of the pump casing located in a cavity 152 of the cylindrical member 138 and centered therein with relation to the motor. The rotor of the pump is connected with the shaft 153 of the electric motor by a universal coupling 154 of suitable construction.

The cylinder 137 is provided with a bore 155, in which a piston 156 reciprocates. The cylinder is provided with cylinder heads 157, 158 bolted to the cylinder by bolts 159, 160, and forming shoulders 161, 162 at the respective ends of the cylinder to limit endwise movements of the piston. The piston 156 is moved back and forth in the cylinder by fluid supplied under pressure to the cylinder by the hydraulic pump 147 (Figs. 2, 4, 6, 8, 10 and 11). Ports 165, 166 of the hydraulic pump are connected with the interior of the cylinder through the heads thereof respectively, the port 165 being connected with a port 167 in the head 157 by a nipple 168, while the port 166 connects by means of a nipple 169 with the passage 170, extending through the head 157, through the cylinder lengthwise of the latter, and connecting with the interior of the cylinder through a port 171 in the head 158.

The heads 157 and 158 are respectively provided with check valves 172, 173, shown as ball check valves, the balls whereof are held in operative relation with the seats of the valves by obstructing pins 174 in the heads. These check valves are inwardly opening valves and communicate with the interior of the cylinder and with a liquid reservoir 175, formed as a pan, received about the hydraulic motor, the fluid pump and the lower end of the mounting for the same, and secured to the support 132 by suitable bolts 176, attaching the same to the lower faces of the brackets 135, 136 of the support 132. A liquid supply pipe 177 communicating with the reservoir has attachment with the bracket 135, and is normally closed by a plug 178. A drain opening 179 normally closed by a plug 180 is provided in the bottom of the pan. A window 181 communicating with the interior of the pan is provided for observing the level of the liquid in the reservoir, which is normally at a level indicated by the dotted line 182, and submerges the outer ends of the check valves.

Rotation of the hydraulic pump causes liquid to be fed under pressure into either end of the cylinder 137, depending upon the direction of such rotation, to move the piston in either direction. The pump feeds into one end of the cylinder, the check valve at that end remaining automatically seated. The pump simultaneously withdraws liquid from the opposite end of the cylinder to lower the pressure on the advancing end of the piston and to feed the pump, any deficiency of liquid in the latter end of the cylinder being supplied through the check valve from the reservoir, the check valve automatically opening inwardly by suction from the pump.

The cylinder and piston form the hydraulic motor 138, one of the members of which is movable in axial direction for transmitting power. In the present exemplification the piston is the movable member to transmit motion to rotate the clamp operating shaft 93 for clamping and unclamping the clamping mechanism (Figs. 4, 5, 6, 7, 8, 9, 10 and 11). The piston is provided with heads 185, 186 which coact with the walls of the cylinder, and the piston is provided with rack teeth 187 meshing with gear teeth 188 formed on an intermediate shaft 189, mounted for rotation in a bearing 190 in the support 132 and a bearing 191 in a supplemental guide bracket 192, fastened to the bracket 136 by bolts 193. A gear 194 formed on the shaft 189 meshes with rack teeth 195 on a rack bar 196, mounted for endwise movement in a guideway 197 formed in the supplemental guide bracket 192 and on a guide face 198 on the support 132.

The bar 196 is also provided with a second set of rack teeth 201 arranged to mesh with teeth of a gear 202 having spline connection 203 with the clamp operating shaft 93 so as to rotate the latter. The gear 202 is provided with journal ends 204, 205 journaled respectively in bearings 206, 207, respectively in the guide bracket 192 and in a block 208 bolted by bolts 209 to the overhanging end of the guide bracket. This overhanging end of the guide bracket surrounds the operating shaft 93 (see also Figs. 2 and 12), which is by said bearings located in definite relation to the operating unit for operating said operating shaft from said operating unit and providing easy means for connecting said operating unit with the operated member, it being readily seen that the operating shaft 93 is readily assembled with the operating unit by axial movement of the lower splined end of said shaft into the gear 202 for definitely relating the operating means to the clamping mechanism. The reciprocation of the piston 156 causes oscillation of the shaft 93 in either direction for rotary movements in either direction of the clamp shafts for clamping and unclamping the bearing of the drill arm about the column.

Figure 6:
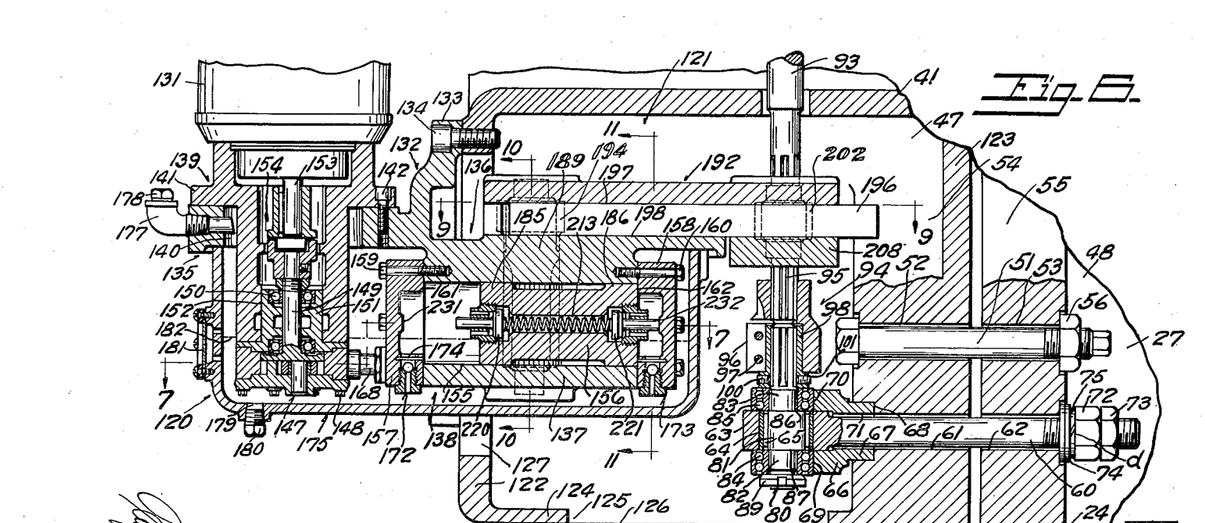
Fig. 6 is a vertical sectional view, taken on the line 6—6 of Fig. 3, showing the operating unit and its connection with the clamping device, and partly broken away.
Figure 7:
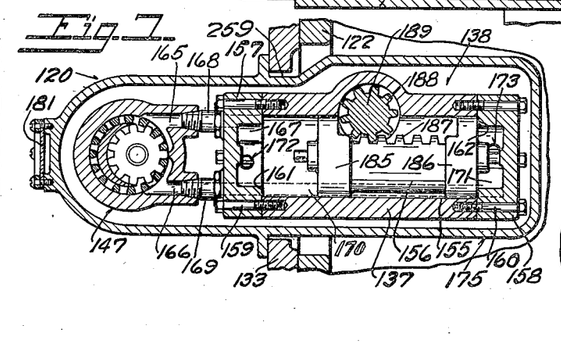
Fig. 7 is a horizontal sectional view of a portion of the same, taken in the plane of the irregular line 7—7 of Fig. 6, and partly broken away.
Figure 8:
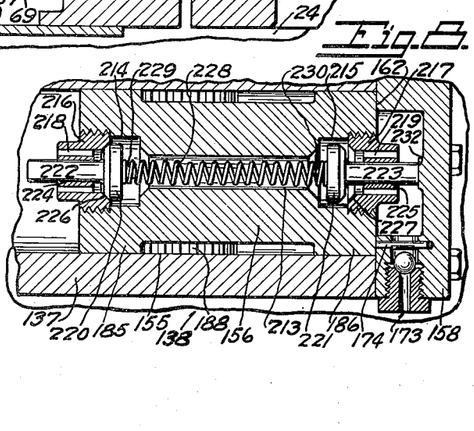
Fig. 8 is an enlarged detail sectional view of the relieving means acting prior to completions of clamping and unclamping movements of the clamp, and taken in the plane of the line 6—6 of Fig. 3, and partly broken away.

In the present exemplification of the invention the axis of the eccentric, represented at a (Fig. 16), is located in the right line, represented by the broken line b, in which the axis of the clamp shaft, represented at c, and the anchor point, represented at d, of the clamping rod, are located (see also Figs. 6 and 13), with the axis of the eccentric between the axis of rotation of the clamp shaft and said anchor, when the clamp is in unclamped relation, as shown in Fig. 6. The axis of the eccentric is therefore in dead center with the axis of said clamp shaft and said anchor, so as to maintain such actuated unclamped relation. Such dead center relation of the axis of the eccentric, but at the opposite side of the axis of rotation of the clamp shaft, also obtains during clamped relation of the clamp, as shown by the dotted position of the eccentric in Fig. 16, so that said clamp is maintained in clamped relation until the eccentric is forcefully moved out of such dead center relation by an actuating element. The eccentrics may if desired be respectively moved slightly past the dead center, with the ends of the piston 156 respectively against the respective shoulders 161, 162, for locking the eccentrics in actuated relations until reversals of rotation thereof respectively.

Upon cessation of movement of the piston 156 in either direction, leakage of clamping liquid takes place between the piston and the wall of the cylinder and past the intermediate shaft 189 into the reservoir, thereby partially emptying the cylinder, so that upon reenergizing the electric motor in either direction its first duty is to fill the empty space, which requires little energy, which, with the leakage which takes place in the pump, enables the electric motor to acquire full speed and power before heavy duty is required of it in the clamping or unclamping operations, enabling a separate electric motor of relatively low power to be employed for clamping and unclamping in the present invention.

During clamping movement of the clamp from unclamped position, during which adjustment of the drill arm has taken place, little duty is required of the electric motor during the beginning of the clamping motion, which enables the electric motor to rapidly acquire full speed and power upon initiation of rotation in the same. During the middle portion of the travel of the eccentric, the high point of the eccentric is farthest removed from the dead center line between the axis of rotation of the clamp shaft and the anchor of the clamping rod. The angle of the line of force between the high point of the eccentric and the anchor, to the dead center line decreases as the eccentric continues to rotate in its clamping action, during which the line of force approaches the dead center line, the ratio of clamping movement in the line of force also decreasing. There is therefore little clamping motion during the final portion of the clamping action, the resistance to clamping action decreasing proportionately, although the clamping force applied is greatest at the final portion of the clamping action, enabling employment of a low power electric motor for the purpose.

When the clamping mechanism is actuated in unclamping direction, the leakages of clamping liquid hereinbefore mentioned enable the electric motor to acquire full speed and full operating force almost instantly, so that by the time the hydraulic mechanism acts to release the eccentrics from clamped relation, the initial portion of this releasing movement will be caused by the full force of the electric motor and hydraulic motor for applying a maximum force at substantially the initial portion of unclamping movement of the eccentrics. At such unclamping initial portion of the movement of the eccentrics, the line of clamping force is in line with the dead center line of the eccentric or at a very slight angle thereto, and the movement of the high point of the eccentric is in substantially a straight line perpendicular to the dead center line, so that such initial portion of the unclamping movement readily takes place, the electric motor maintaining its full force and speed during the succeeding angles of movements of the eccentric, to readily unclamp the clamp.

It will therefore be noted that at the ends respectively of the clamping movement and of the unclamping movement of the operating shaft, the electric motor is operating under full power, during which it is desired to deenergize the motor for quick stoppage of the eccentric, when in fully clamped or unclamped relation. Such sudden deenergizing of the electric motor under full load is detrimental in various respects, among which may be instanced extreme arcing of the switches by opening the same under full load of the motor, violent striking of the heads of the piston against the heads of the cylinder, and undue strains and noise of operation. In order to avoid such detrimental tendencies means are provided whereby the force moving the piston 156 in either direction is decreased as the piston nears its end of movement in either direction.

Relieving means are provided which act to lessen the load on the electric motor at the ends of operation thereof in clamping and in unclamping directions and thereby allow the electric motor to be deenergized while operating under much less than full load.

In the present instance these means are shown as by-pass means for the liquid from the hydraulic pump to allow the liquid to partially by-pass the piston 156 during the end portions of its movement in either direction. (Figs. 6, 7, 8, 10 and 11.) Thus the piston 156 is provided with a bore 213 extending lengthwise thereof along its axis and terminating at both ends in enlarged bores 214, 215. Plugs 216, 217 are threaded in the respective end bores and have fluid passages 218, 219 therethrough, normally closed by valves 220, 221, respectively having stems 222, 223 slidable endwise in central bearings 224, 225 in the respective plugs, and extending outwardly therefrom. The valves normally seat on valve seats 226, 227 on said plugs and are resiliently urged toward said seats by a spring 228 in the bore 213 and seated centrally at its opposite ends on lugs 229, 230 on said valves. The cylinder heads are provided with central contact faces 231, 232 with which the valve stems are respectively arranged to coact for unseating the valves respectively at the final portions of movement in either direction of the piston 156.

In operation, assuming that the piston is moving toward the left (see Figs. 6, 7 and 8), in a clamping action, the liquid from the hydraulic pump is fed into the cylinder at the right hand end of the piston for moving the piston toward the left. The force of the liquid opens the right-hand valve 221 for feeding liquid into the bore of the piston, which is, however, arrested by the closing of the left-hand valve 220, and the piston and its valves move as a solid body throughout the major portion of the actuated movement of the piston. Immediately prior to the end of such movement of the piston, the valve therein at the end of the cylinder toward which the piston is moving, namely, the left-hand end, contacts the head of the cylinder at such end for opening the valve thereat, and thereby a portion of the actuating liquid is by-passed through the piston for slowing down the movement of the piston at the final portion of its movement in actuating direction, and thereby relieves the load on the electric motor at such final portion, so that when the piston reaches the end of its stroke, the electric motor will be deenergized at considerably less than full load, for avoiding excessive arcing in the switches, and for reducing the speed of the stroke of the piston in order to minimize blows of the piston upon the ends of the cylinder and jars and shocks incident to sudden stoppage of the parts, and preventing overthrow of the eccentric.

Similar but reverse movements take place during opposite actuation of the electric motor and the hydraulic motor and opposite axial movement of the piston of the latter, for unclamping action, the reduction in speed of the piston in this instance taking place just prior to the end of the axial movement of the piston in opposite direction by opening the valve at the opposite or right-hand end of the piston for by-passing the actuating liquid in opposite direction. The piston comes to a stop at reduced speed at the end of its movement in either direction.

Means are provided for initiating actuation of the electric motor in either direction, and control means operated by the clamping mechanism are provided for stopping the electric motor to place the high points of the eccentrics in dead center positions at the ends of the clamping and unclamping movements of the clamps and for controlling the direction of rotation of the electric motor. The initiation of rotation of the electric motor in either direction is in the present instance accomplished by manually operated normally open switches 237, 238, respectively provided with manual push buttons 239, 240 for closing the same (Figs. 1, 2, 12, 14 and 17). These push buttons are located in suitable convenient positions, as on the drill slide 35, within convenient reach of the operator, to provide remote control for the electric motor 131.

Figure 17:
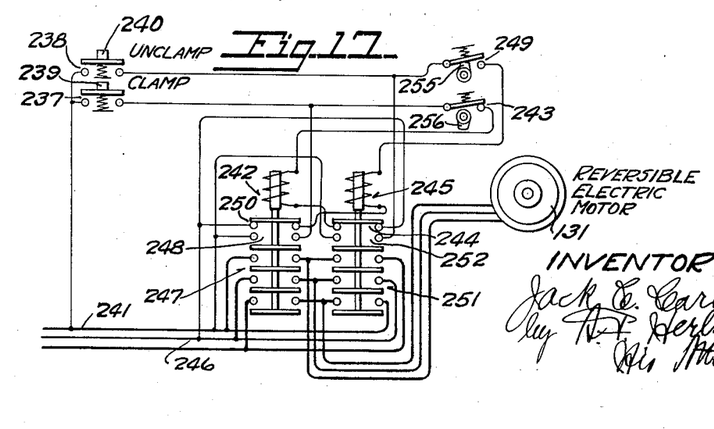

In the present exemplification the switch 237 is arranged to initiate rotation of the electric motor in direction to cause clamping of the drill arm on the column and is connected in circuit with one of the power supply lines 241 and with one end of the coil of a magnetic relay 242 through a control switch 243 in series therewith actuated by the clamping mechanism, and which has been moved into closed relation by the unclamping movement of the clamp. The other end of the relay coil is connected through a normally closed relay switch 244 operated by a magnetic relay 245 to another of the supply lines 246. The relay 242 is arranged when energized to connect the electric motor 131 to the supply lines through switches 247 in manner to cause the motor to rotate in clamping direction and to remain closed or in connecting position by closing of the maintaining switch 248 by the relay 242 until the arm is fully clamped, although the button 239 may have been released before the clamp is fully clamped. To maintain the relay 242 energized and the motor circuit closed in clamping direction, a maintaining circuit for said relay is provided including the switch 248 arranged to connect the relay coil 242 to the power supply line through the control switch 243. This circuit is in parallel with the initiating circuit above mentioned as established when the button 239 is pressed. The motor continues to rotate in proper direction to cause clamping of the arm clamp in fully clamped relation, in time with which the control switch 243 is opened by the clamping mechanism, thereby breaking the maintaining circuit and stopping the motor.

The other switch 238 of the manually operable switches is connected in similar manner to one of the supply lines and to one end of the coil of the relay 245 through a control switch 249, in series with the latter, the other end of the coil being connected through the normally closed switch 250 with another of the supply lines. The relay 245 is arranged when energized to close switches 251 connecting the motor 131 to the supply lines in manner to cause rotation of the motor in direction to cause unclamping of the arm clamp. The relay 245 is maintained in closed relation by a maintaining circuit connected to one of the supply lines and connected by a switch 252 of the relay 245 to the coil of said relay through the control switch 249. This maintaining circuit is in parallel with the initiating circuit momentarily closed by the manual closing of the switch 238. Thus, when the switch 238 is closed by depressing the button 240 the relay 245 is energized, the motor 131 rotates in unclamping direction and continues to so rotate until the clamp is in fully unclamped relation, in time with which the maintaining circuit for the relay 245 is opened by opening of the control switch 249 by the clamping mechanism.

The switches 250 and 244 of the relays 242, 245, connected in series with the coils of the relays 245, 242 respectively, are provided as a safety means to prevent simultaneous energization of the two relay coils with consequent short-circuiting of the power supply lines. The control switches 243, 249 are in the form of limit switches and may be double acting snap switches and are preferably normally closed switches arranged to be opened by the tappet mechanism at respectively substantially the moments of fully clamped and unclamped relations of the drill arm.

The manual switch 237 is in series with the control switch 243 and the relay switch 244 for initiating rotation of the electric motor in clamping direction, and the manual switch 238 is in series with the control switch 249 and the relay switch 250 for initiating rotation of the electric motor in unclamping direction. The closing of the manual switch 237 energizes the coil of relay 242 for closing the switch 248 in parallel with the manual switch 237, so as to maintain the clamping circuit closed upon release of the manual switch 237. The closing of the manual switch 238 energizes the coil of the relay 245 for closing the switch 252 in parallel with the manual switch 238, so as to maintain the unclamping circuit closed upon release of the manual switch 238.

The limit switches 243, 249 are mounted on the bearing 27 of the drill arm in suitable manner adjacent to the shaft 93 (Figs. 1, 2, 3, 13, 14 and 17). The shaft 93 is provided with switch operating tappets 255, 256 adjustably secured to said shaft for adjusting the angles of the tappets with relation to said shaft and to each other and to said switches, to accurately time the de-energizing of the electric motor in clamping and in unclamping directions for insuring fully clamped and unclamped relations in the clamping mechanism, and preventing overthrow of the same. The hubs of the respective tappets are adjustably secured to the clamp operating shaft 93 respectively by set screws 257, 258.

The control switch 249 is opened and the control switch 243 is closed by the clamping mechanism (Fig. 17) at the end of the unclamping movement, so that a further energizing of the electric motor in unclamping direction is prevented by the open relation of the control switch 249, compelling the next rotation of the electric motor to be in clamping direction by the closed relation of the control switch 243. At the end of the clamping movement the clamping control switch 243 is opened and the unclamping control switch 249 is closed, thereby preventing another rotation of the electric motor in clamping direction and insuring that the following rotation of the motor shall be in unclamping direction. This insures proper sequence of operations of the clamping mechanism for unclamping the clamping mechanism prior to elevational adjustment of the drill arm and for clamping the clamping mechanism after such adjustment.

In operation, when the clamp is to be operated, it is necessary only to momentarily depress either the switch button 239 for clamping or the switch button 240 for unclamping, whereupon the corresponding relay switch will close the electric motor circuit and maintain the same closed and cause the motor 131 to rotate in proper direction. The hydraulic pump 147 driven by the electric motor 131 propels fluid under pressure into the fluid motor 138 and causes the piston 156 therein to move endwise and, by means of its connection with the shaft 93, rotates the eccentrics in selected directions to cause clamping or to cause unclamping of the arm on the column. As the piston 156 nears its end of its movement in either direction, the pressure of fluid on the piston is automatically decreased by means of the two oppositely acting valves 220, 221 in the piston.

These valves begin to open just before the end of the stroke and act to slow up the movement of parts just prior to the end of clamping and unclamping movements, thus preventing the jar due to sudden stoppage of fast moving parts. By this means the load on the motor is also lessened immediately before the electric motor circuit is opened, so that when the electric motor is stopped by the opening of one of the control switches 243, 249 by the corresponding one of the tappets 255, 256 on the shaft 93, the motor current is at a low enough value to provide for easy interruption thereof. The provision of the means for decreasing the pressure on the piston 156 at the ends of movement there are particularly desirable in the present exemplification where the stopping of the electric motor is automatic.

Further explaining the operation of the invention, it may be stated that there is a reversible electric motor 131 which is direct connected with the reversible hydraulic pump 147, the electric motor and the hydraulic pump being arranged on vertical axes, the pump having fluid connection with the hydraulic motor 138 adjacent thereto and arranged to operate the hydraulic motor in reverse directions, depending on the direction of rotation of the rotor of the electric motor. The movable member of the hydraulic motor is geared to an axially movable rack movable in reverse directions by the reverse directions of movement of movable member of the reversible hydraulic motor, the rack having operative connection with the clamp operating shaft 93 for rotating the latter in reverse directions. The electric motor, the hydraulic pump, the hydraulic motor and the power connecting member or rack between these driving means and the operated shaft are assembled as a unit on the support or foundation 132, shown as a casting, and having an upright flange 133 attached to one of the side walls 122 of a cavity 121 under the shelf 41 extending from the bearing of the drill arm opposite to the side of said bearing from which the drill arm proper extends laterally.

This foundation or support is provided with an outer bracket 135 on which a mounting member 139 for the electric motor 131 and the hydraulic pump 147 are located, and which extends through a bearing on said bracket and is located preferably on the outside of the boxed shelf extending from the rear of the drill arm. The cylinder of the hydraulic motor depends from an inner bracket 136 of this foundation or support, and the guiding means for the rack bar are located on such inner bracket, and the supplemental bracket 192 secured thereto; the inner bracket, the supplemental bracket, the cylinder and the guiding means extending into the cavity in said boxed shelf from the securing flange 133, with the inner end of the supplemental bracket located about the axis of the upright clamp operating shaft 93 for relating the driving unit to such clamp operating shaft. There is a reservoir for the pressure liquid extending through an opening 259 in the upright wall 133 of the foundation or support and received about the hydraulic pump 147, the lower end of the connection between said hydraulic pump and the electric motor, and about the hydraulic motor, for feeding the hydraulic motor and receiving excess liquid therefrom.

There is slight leakage in the hydraulic pump and in the hydraulic motor which does not detrimentally affect these parts when under rapid operation and under load. This slight leakage in the hydraulic motor 138 permits the pressure liquid to seep between the piston and wall of its cylinder into the reservoir to the level of liquid in the reservoir, leaving space in the cylinder above such level, during rest positions of the hydraulic motor, so that, upon reenergizing of the electric motor in either direction, there is little duty on the electric motor at the beginning of rotation thereof, and until the space in the cylinder 137 resulting from such leakage has been filled with the pressure fluid, by which time, that is, almost instantly, the electric motor will have acquired full speed and power so as to exert its full speed and power upon the actuating means for the clamping devices in clamping and in unclamping directions by the time such clamping and unclamping duties must be performed. The clamping and unclamping of the device therefore takes place during full speed and full power of the electric motor.

Means are, however, provided to relieve the duty on the electric motor both in clamping and unclamping directions immediately before or substantially at the arrival of the clamping and unclamping devices at their fully clamped and unclamped moments, so as to avoid deenergizing of the electric motor while at full speed and power, in order to avoid detrimental arcing when opening the switch for stoppage of the electric motor, to prevent forceful striking of the movable member of the hydraulic motor with the coacting member therefor, and to prevent other jars and noises which would otherwise be present. Such relief is effected by providing a bypass for the pressure fluid at the proper instant, exemplified as the valves 220, 221, which are opened at the respective ends of the strokes of the piston of the hydraulic motor. The clamping means are of such character that the clamping force is reduced approximately at the moment of full clamping or unclamping action so that stoppage of the electric motor takes place under reduced load on the electric motor, resulting in extreme accuracy in the stoppage of the clamping means at dead center positions, or approximately so, in order to maintain such clamping means in actuated clamping or unclamping relations until the next positive intentional actuation of the clamping device.

The clamping means are exemplified as eccentrics, the high points of the eccentrics being in approximately the dead center line between the axis of rotation of the eccentric and the anchor point of the clamping member connecting with the eccentric, the axis of the eccentric in the present exemplification being between said axis of rotation and said anchor, and at the outside of said axis of rotation and said anchor, when respectively in unclamping and clamping relations.

Adjusting means for angular adjustments are provided between the respective eccentrics and between said eccentrics and the driving means therefor, as the couplings 94, 103, and between said clamping means and the stopping means for the electric motor, as at tappets 255, 256, so that the clamping forces in the clamping means are equalized throughout the movements of the clamping means, and so that the eccentrics are brought to positions of rest in substantially dead center relations at the ends of their actuated movements.

It is, of course, understood that changes and modifications may be made in the means and their relations herein shown and described within the spirit of the invention set forth in the accompanying claims.

I claim:

1. In a clamping mechanism of the character described for a machine tool part, the combination of a plurality of clamps for said machine tool part, a reversible electric clamping motor, a reversible hydraulic motor actuated in reverse directions thereby, a clamp operating shaft actuated by the latter, clamp shafts for said respective plurality of clamps, initiating switches for reverse rotations in said electric motor for reverse actuations of said reversible hydraulic motor, control switches for controlling said reverse rotations in said electric motor respectively in series with said respective initiating switches, actuating means for the control switches including adjusting means for angular adjustment between said control switches and said actuating means, the axes of said last-named adjusting means, said clamp operating shaft and said clamp shafts arranged in substantial alinement, and angular adjusting means between said respective clamp shafts and said clamp operating shaft, whereby to adjust the relative clamping moments and durations of clamping and unclamping movements of said clamps.

2. In clamping mechanism for a metal working machine element, the combination of a movable clamping member arranged when actuated to effect clamping and unclamping of the clamp, power means connected to actuate said member and comprising a movable element and a relatively stationary element, control means for said power means having operative connection with said movable clamping member and arranged to neutralize said power means proximate to the ends of clamping and unclamping movements of said member, and automatic means comprising a pair of coacting contact parts respectively on said respective elements and one of which has movement supplemental to the movement of said movable element by the contact relation with the other of said coacting parts to lessen the force imparted to said member by said power means as said member approaches its ends of movements.

3. In clamping mechanism for a metal working machine element, the combination of a clamp, means for operating said clamp including a reversible electric driving means, hydraulic transmission means between said reversible electric driving means and said clamp, and automatically operated means independent of said reversible electric driving means and connected with an element of said hydraulic transmission means for automatically decreasing the power transmitted by said hydraulic transmission means to said clamp when the parts of the clamp approach fully actuated relation, said decrease of power reacting on said reversible electric driving means to partially unload said reversible electric driving means.

4. Clamp operating means for a metal working machine element comprising in combination a clamp, a fluid pump, an electric motor connected with said fluid pump for driving said pump, a fluid motor connected with said pump for driving said fluid motor, said fluid motor having operative connection with said clamp, control means for said electric motor arranged when actuated to cause rotation of said electric motor selectively for clamping and unclamping movements of said clamp, automatic control means for stopping said electric motor for fully actuated relation of said clamp, and a normally closed by-pass for the fluid from said pump to by-pass said fluid motor and opened by movement of said fluid motor in timed relation with said stopping of said electric motor by said control means.

5. Clamp operating means of the character described for a metal working machine element, comprising, in combination, a clamp, a reversible fluid pump, a reversible electric motor connected with said fluid pump for driving said pump selectively in reverse directions, a fluid motor connected with said pump to be driven thereby and having operative connection with said clamp, manual control means for said electric motor arranged when actuated to cause rotation of said electric motor in direction selectively for clamping and unclamping of said clamp, automatic control means for stopping said electric motor for fully actuated relation of said clamp, and a normally closed by-pass for the fluid from said pump to by-pass said fluid motor and opened by movement of said fluid motor in timed relation with said stopping of said electric motor by said automatic control means.

6. In clamping mechanism for a metal working machine element, the combination of a clamp, a fluid motor for operating said clamp comprising a cylinder and a piston reciprocable in said cylinder between the ends thereof, operative connections between said piston and said clamp for operating said clamp upon movement of said piston, a fluid pump having its opposite ports connected to opposite ends of said cylinder and arranged to be driven selectively in reverse directions to propel fluid into said cylinder at either end of said piston and to withdraw fluid from the other end of said cylinder for moving said piston in reverse directions; and a normally closed by-pass for said fluid extending through said piston and by-passing said piston and arranged to be automatically opened by movement of said piston as said piston approaches the ends of said cylinder.

7. Clamping mechanism for a metal working machine element combining a clamp, a movable clamping element, power means including an electric motor, a fluid pump driven by said electric motor selectively for clamping and for unclamping movements of said clamp, a fluid motor connected with said fluid pump and including a movable member actuated by fluid of said fluid pump and connected to actuate said clamping element to cause respectively clamping and unclamping of the clamp, control means for said electric motor arranged when actuated to cause rotation thereof selectively for clamping and for unclamping movements of said clamp, automatic stopping means for said electric motor actuated in synchronism with said clamping element to deenergize said electric motor proximate to the ends of clamping and unclamping movements of said clamping element, and by-pass means for said fluid motor operated by movement of said movable member when said movable member approaches its ends of clamping and unclamping movements to partially unload said electric motor prior to stopping thereof.

8. Clamping mechanism for a metal working machine element combining a reversely movable clamping element, power means including a reversible electric motor connected to actuate said clamping element in reverse directions to cause clamping and unclamping of the clamp, manually controlled means for said electric motor to cause rotation thereof selectively in reverse directions, automatic stopping means operatively connected with said clamping element and arranged to stop rotation of said electric motor proximate to the ends of movements of said clamping element, and means independent of said electric motor and operatively connected with said power means to diminish the force imparted to said clamping element to partially unload said electric motor just prior to the stoppage of said electric motor by said automatic stopping means.

9. Operating means for a clamp for a metal working machine element comprising a reversible electric motor, a reversible hydraulic pump operated thereby, a reversible hydraulic motor actuated by said hydraulic pump and having an actuated reversely movable element, a clamp operating member, a drive connection between said reversely movable element and said clamp operating member, said clamp having clamping and unclamping moments, switch means for said reversible electric motor, by-pass means for the fluid of said reversible hydraulic motor, means to actuate said by-pass means to relieve operating pressures in said hydraulic motor proximate to said clamping and unclamping moments, and operating means for said switch means to deenergize said electric motor during such relief of said operating pressures.

10. In a drilling machine including an upright, a drill arm having a bearing on said upright and a hollow shelf extending rigidly from said bearing opposite to the direction in which said arm extends, clamping members respectively clamping the upper and lower portions of said bearing, a clamping unit having attachment with said drill arm and comprising a bracket having an outer shelf and an inner shelf, an upright electric motor and a fluid pump rigid with said outer shelf and located respectively above and below said outer shelf and connected for combined operations, a fluid motor rigid with said inner shelf in the hollow of said hollow shelf, a cam for each of said clamping members, an intermediate shaft between said cams, adjusting means between said shaft and each of said cams for adjusting the angular relations between each of said cams and said shaft and between each other, operating means between said fluid motor and said shaft to rotate said cams, switch means controlling the respective clamping and unclamping rotations of said electric motor, and tappets adjustable about the axis of rotation of said shaft to control the actuations of said switch means.

11. Operating means for a clamp for a metal working machine element comprising an electric motor, a fluid pump operated thereby, a fluid motor actuated by said fluid pump and having an actuated element, a clamp operating member, a drive connection between said actuated element and said clamp operating member, said clamp having clamping and unclamping moments, switch means for said electric motor, by-pass means for the fluid of said fluid motor, means to actuate said by-pass means to relieve operating pressures in said fluid motor proximate to said clamping and unclamping moments, and operating means for said switch means to deenergize said electric motor during relief of said operating pressures.

JACK C. CARLTON.